Aug. 24, 1954 J. L. D. MORRISON ET AL 2,687,450

COLOR TELEVISION

Filed Aug. 10, 1951

2 Sheets-Sheet 1

Inventors:-
James L. D. Morrison &
Willard J. Faulkner
By: Fred Gerlach
Atty.

Inventors,
James L. D. Morrison &
Willard J. Faulkner
By: Fred Gerlach
Atty.

Patented Aug. 24, 1954

2,687,45

BEST AVAILABLE CO

UNITED STATES PATENT OFFICE 2,687,450

COLOR TELEVISION

James L. D. Morrison and Willard J. Faulkner, Benton Harbor, Mich., assignors to V-M Corporation, Benton Harbor, Mich., a corporation of Michigan Application August 10, 1951, Serial No. 241,254

2 Claims. (Cl. 178—5.4)

The present invention relates in general to television, and has more particular reference to the transmission and reproduction of television picture images in full color.

Television picture transmission and reproduction is presently accomplished by electronically "scanning" the picture or view to be transmitted, in order to produce a signal wave containing electrical impulses corresponding to the various light values of the view to be transmitted. The signal wave may then be delivered, by wire or radio transmission means, to a remote receiving station where the impulses may be reconverted to a corresponding visual image of the transmitted picture or view.

The initial scanning of the picture or view to be transmitted is commonly accomplished by means of an iconoscope comprising a cathode ray tube embodying a screen of light sensitive material upon which an image of the picture may be applied, as by focusing such image on the screen, usually through a suitable optical lens system. In the iconoscope, means is provided for causing an electron beam, of pencil-like character, to sweep across the screen in fashion applying the beam successively upon all integral portions of the screen in order thus to cover all of its area during a scanning cycle.

The scanning beam may be moved in a predetermined scanning path pattern in order to successively cover all portions of the screen of the iconoscope tube, as the result of the performance of a single scanning cycle; and the scanning apparatus, of course, may be operated to repeat continuously the cyclical scanning movement of the beam.

Usually the path pattern conventionally employed for scanning a screen, during one complete scanning cycle, consists in moving the beam transversely of the screen from one side thereof to the opposite side, the first sweep of the beam tracing a path parallel to and along an edge of the screen. Successive sweeps of the beam trace paths each in closely adjacent juxtaposition and parallel with respect to the immediately preceding transverse sweep path of the beam, until the entire screen has been scanned to thus complete the scanning cycle. The area of the screen is thus divided into a plurality of parallel adjacent paths; and a scanning cycle may be accomplished by tracing the scanning beam along all of said paths in succession, from one side of the screen to the other, such procedure being commonly called progressive scanning. Alternately the paths may be scanned by causing the beam, during one scanning cycle, to successively trace alternate paths, such as the first, third, fifth, and so forth, across the screen, and then, during the next scanning cycle, causing the beam successively to trace the other paths, such as the second, fourth, sixth, and so forth, across the screen, such procedure being commonly called interlaced scanning. Various other scanning procedures may, of course, be employed.

The scanning operation, of course, takes place extremely rapidly, one complete screen scanning cycle being accomplished within a small fraction of a second. The scanning zones or bands, which comprise the paths of the beam in traversing the screen, also are of relatively narrow width of the order of $\frac{1}{32}$ inch or less.

By means of suitable amplifying and translation circuits operatively associated with the screen and scanning beam, electrical impulses are developed, in the beam and in said circuits, which correspond exactly with the light values of the scanned image at every portion thereof along the sweep paths or zones scanned by the beam. Such fluctuating impulses may be transmitted as a continuous signal wave, by wire or radio signaling equipment, and delivered at a receiving station for conversion to visible condition, in an image reproducing tube. The reproducing tube commonly comprises a cathode ray tube embodying a screen of fluorescent material and means for applying a pencil-like electron beam upon the screen for the purpose of exciting the same, in accordance with the fluctuations of the signal wave applied thereto. To this end the electron beam may be caused to traverse or scan the screen of the reproducing tube in fashion exactly comparable to the scanning movement of the beam of the iconoscope. The scanning beam of the reproducing tube also may be made to carry electrical screen exciting energy, at intensities which fluctuate in accordance with the transmitted signal impulses, which correspond to the scanned light values of the picture being transmitted, as developed by the scanning procedure in the iconoscope, to thus instantaneously excite the fluorescent screen of the reproducing tube in accordance with such light values and thereby reproduce the transmitted picture on the screen. Suitable signal impulses may, of course, be transmitted with the signal and applied to control the scanning speed and movement of the electron beam of the reproducing tube in order to keep the same exactly in synchronism with the transmitted light value impulses.

The present invention has for its important ject the provision of means operable in con-nction with conventional television transmit-ng and reproducing equipment to enable trans-itted pictures, reproduced on the screen of the age reproducing tube, to be viewed in full olor; a further object being to provide means for canning the picture successively in accordance ith light intensities corresponding with compo-ent primary colors of the picture being trans-nitted, whereby successive sections of the trans-mitted signal wave, representing successive scan-ning cycles, will comprise the light values of the transmitted picture respectively in terms of its primary color components, and to provide means for viewing the picture, as reproduced on the screen of the reproducing tube, in terms of its component color values during successive scanning cycles.

Another important object of the invention is to provide means for viewing the screen of a television image reproducing tube successively through filters of unlike color characteristics in order thus to apply appropriate color values in the reproduced picture image during corresponding color scanning cycles; a further object being to provide a multiple color filter movable with respect to the screen of the reproducing tube in order to present appropriately tinted portions of the filter in registration with a scanned portion of the screen as the same is being scanned.

Another important object of the invention is to provide a color filter element comprising transversely disposed and adjacently arranged color bands and to provide for moving the same in front of the viewing screen of the reproducing tube in fashion presenting appropriately colored portions of the filter in registration with scanned portions of the screen, while such portions are being scanned.

Another important object is to provide blocking means oeprable, in conjunction with the filter member, to pass light rays, emitted by the viewing screen, through appropriate color bands of the filter member, and to prevent such emitted rays from passing through color portions of the filter other than the appropriately tinted portions thereof, during a particular scanning cycle, including means for relatively shifting the blocking means and the filter to direct such transmitted light rays successively through different color bands of the filter, during successive scanning cycles of the tube.

Another important object is to form the blocking means as a composite lens comprising transversely extending lens sections adapted to concentrate light rays applied to the lens and transmit the same through relatively narrow spaced apart light transmission slits, thereby blocking light transmission through areas intermediate said light transmitting slits, and allowing for the transmission of substantially all of the light, applied to the composite lens, through similarly colored spaced apart bands of the filter, while excluding the passage of light through intermediate and differently colored bands of the filter; a further object being to provide like composite lens means for rectifying or diffusing such slit transmitted light rays, after delivery of the same through the filter.

Another important object is to provide a filter in the form of an endless strip of transparent material having identical color band zones, each comprising bands of unlike color successively formed thereon, throughout the length of the strip, so that corresponding color bands in the several zones of the strip have the same color and will be equally spaced in the strip and each separated from the next adjacent band of like color by a band or bands of like width and unlike color; a further object being to provide for moving the filter strip, with respect to the blocking member, at a rate of speed correlated with the scanning cycle speed, at which the reproducing tube is operated, so as to present filter bands of like color progressively and successively in registration with the light transmitting slits of the blocking means, as screen emitted light rays produced by the scanning beam traverse the slits.

A further object is to relate the spacement of the light transmitting slits with the spacement of bands of like color in the filter, so that when a band of one color is in registration with a slit along one side of the screen, a band of different color will be in registration with the slit at the opposite side of the screen, to thereby facilitate the accomplishment of successive scanning cycles in different colors, the intermediate slits being each progressively offset with respect to like color bands, across the area of the screen.

The foregoing and numerous other important objects, advantages and inherent functions of the invention will become apparent as the same is more fully understood from the following description which, taken in conjunction with the accompanying drawings, reveals a preferred embodiment of the invention.

Referring to the drawings,

Fig. 1 is a side view of a television image reproduction tube provided with color viewing means embodying the present invention;

Figs. 2 and 3 are sectional views taken substantially along the lines 2—2 and 3—3 in Fig. 1;

Figs. 4 and 5 are enlarged sectional views taken substantially along the lines 4—4 and 5—5 in Fig. 3;

Figures 1, 2, 3:
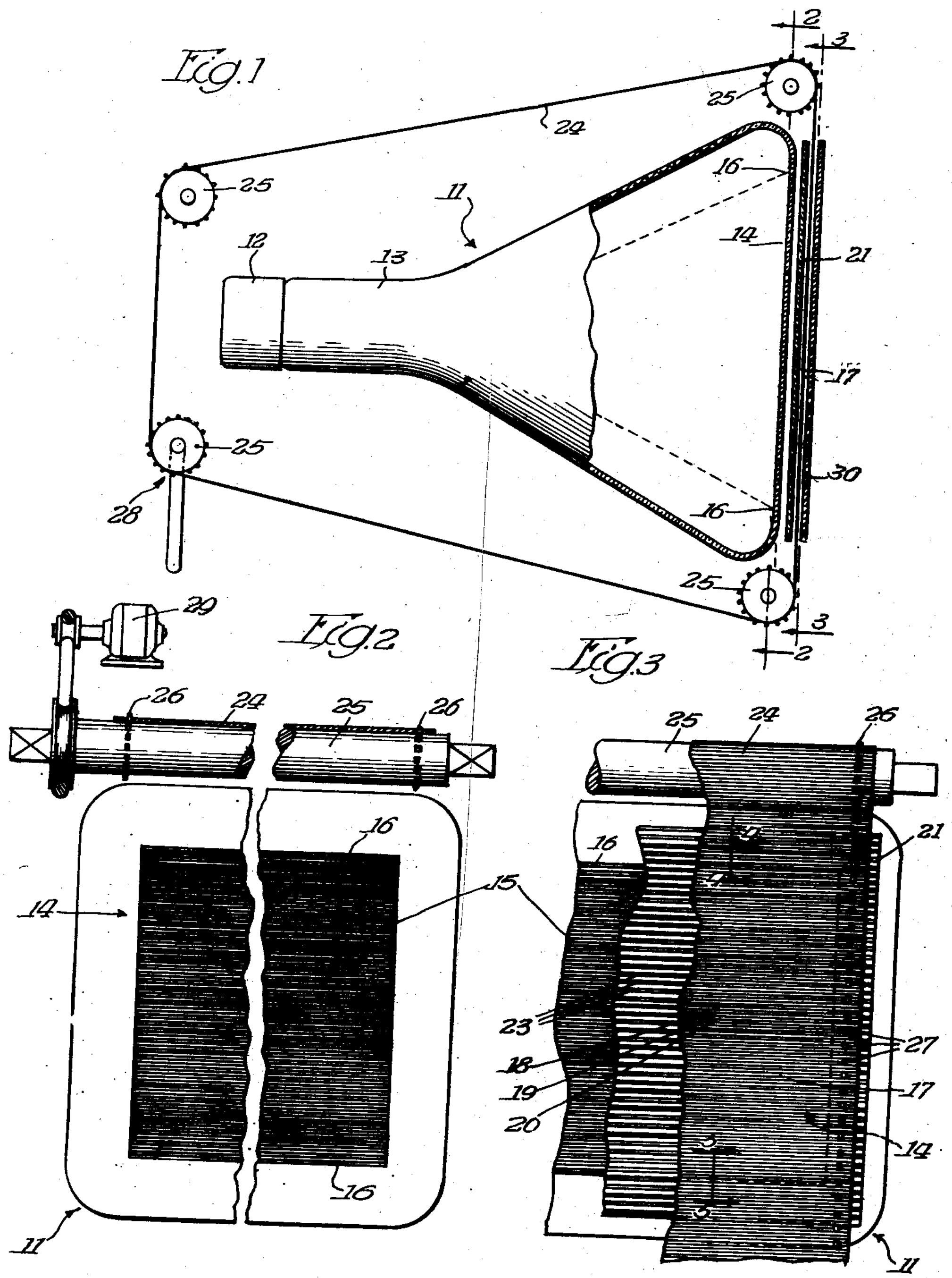

To illustrate the invention, the drawings show a conventional cathode ray television viewing tube 11 comprising a glass envelope forming a barrel or stem 13 fitted with a mounting member 12 at one end, the tube embodying a picture screen 14 of luminescent material, disposed on the wall of the tube at the end thereof remote from the mounting member 12. The tube, of course, may include electronic elements forming an electron gun which may be of conventional character located within the barrel 13 and operable, through suitable circuit connections extending in and through the mounting member 12, to project a pencil-like beam of electrons upon the screen 14. Conventional means may also be provided in, or in association with, the tube for moving the beam horizontally and vertically on the screen for scanning purposes. To this end, the beam may be caused to move transversely of the screen 14 along scanning paths 15 extending from one side of the screen to the other within a zone defined by the lines 16 to thereby cover or scan the entire useful area of the screen by successively traversing the beam along parallel and adjacent paths denoted by the lines 15 from the top of the screen to the bottom thereof. It will be understood, of course, that scanning may be accomplished along horizontal paths, as shown, either from top to bottom of the screen, or vice versa; or the screen may be scanned successively along adjacent ver-

BEST AVAILABLE COF tical paths from one side of the screen to the other, it being conventional and preferable, however, to scan horizontally.

It will be understood, of course, that the electron gun and beam deflecting apparatus of the reproducing tube may be operated and controlled in accordance with a signal wave received from a remote transmitter. Such wave comprises successive impulses representing the light values of the picture being transmitted, as determined by repeatedly scanning the same at the transmitting station, as by means of an iconoscope operated to scan the picture for transmission in fashion exactly comparable to the scanning of the screen 14 in reproducing the picture. The signal wave may also include synchronizing or monitoring impulses applied therein, as at the conclusion of each complete scanning cycle, or at the conclusion of each scanning path 15, or both, such monitoring impulses being employed, in the reproducing tube, to synchronize the movement of the scanning beam in order to correlate the same with the light value impulses carried in the transmitted signal wave. If desired, any suitable means may be incorporated in the scanning equipment, at the transmitting station, for scanning the picture to be transmitted successively in terms of the light values of its component colors—its red, blue and green light values, for example—during successive scanning cycles of the iconoscope equipment, whereby the resulting signal wave, in the portions thereof representing such successive scanning cycles, will successively contain signal impulses corresponding with the light values of the selected color component of the scanned picture.

The present invention provides for presenting color filter means in front of the viewing screen of an image reproducing tube so that filter portions, comprising a color component, such as red, will be presented opposite the scanned portions of the screen during one scanning cycle, other filter portions, providing a different color component, such as blue, will then be presented opposite the portions of the screen scanned during the succeeding scanning cycle, yet other filter portions, comprising still a different color component, such as green, will thereafter be presented opposite the scanned portions of the screen during the next following scanning cycle, and so on, repeatedly, such color filter succession being continuously repeated in order to produce television in full color, the successive red, blue and green light images, because of the phenomenon of persistance of vision, blending to present the televised picture to the eye of the observer, in full color.

The foregoing result is attained, in accordance with the teachings of the present invention, by providing color filter means 17 disposed in position, in front of the screen 14 and between it and the eye of an observer, said filter means comprising a sheet of light transparent material of size sufficient to entirely cover the screen. This sheet may be formed with adjacent color zones each comprising bands 18, 19 and 20, respectively comprising colors such as red, blue and green, said color bands extending in the filter in the direction of scanning movement of the electron beam across the screen 14, said bands being preferably of identical width and disposed in the screen in side by side edge abutting relationship and being identically repeated, as to color, in each zone throughout the length of the member 17. The filter may comprise color photographic film in which the color bands are formed by pho graphic procedures, or it may comprise a sh of plastic material tinted in any preferred fas ion to form the color bands therein.

Light transmitting and blocking means 21 also provided, in order to apply light rays, ema nating from the screen as the result of scree excitation during one complete scanning cycl through filter bands of the same color. Suc means may comprise a plate of opaque materia having light transmitting slits therein extending in the direction of the colored band portions of the filter element, such slits having width equal to or slightly less than the width of a color band of the filter member and being spaced apart either slightly less than or slightly more than the spacement of like color bands in the filter element. A light opaque plate formed with light transmitting slits, however, will block substantial quantities of light rays emanating from the screen. Consequently, in the interests of light transmitting efficiency, it is preferable to form the blocking means 21 as a composite lens adapted to receive all of the light which emanates from the screen and concentrate the same in slit-like zones for transmission through the tinted bands of the color filter 17.

Figure 4:
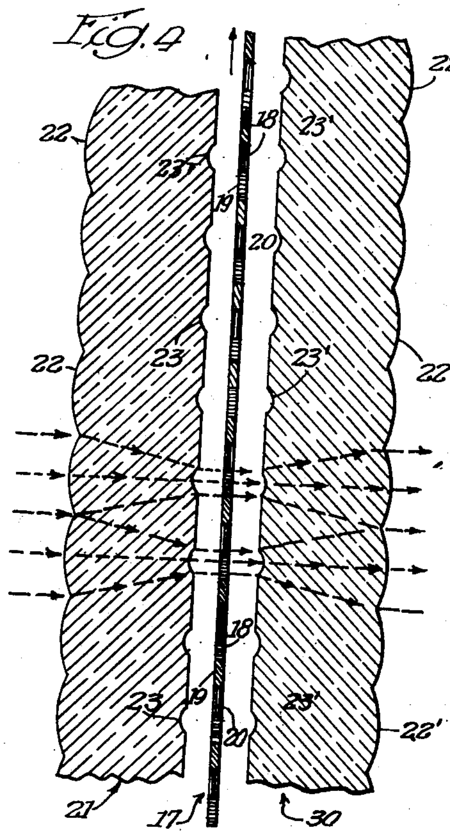
Figure 6:
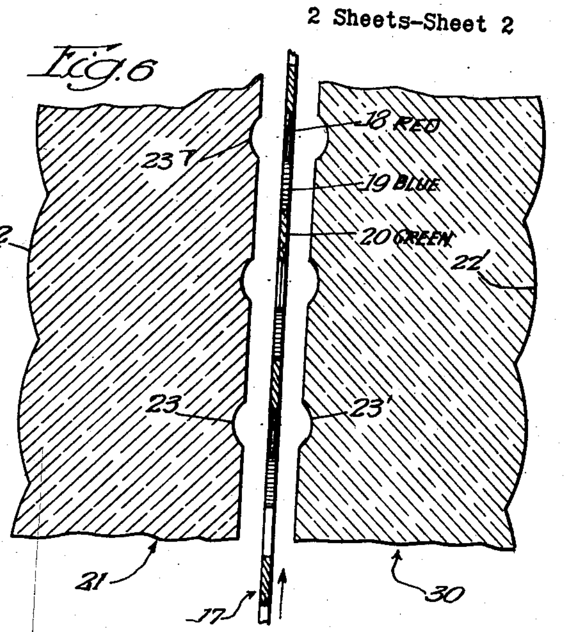
Fig. 6 is an enlarged view of a portion of the structure shown in Fig. 4.
Figure 5:
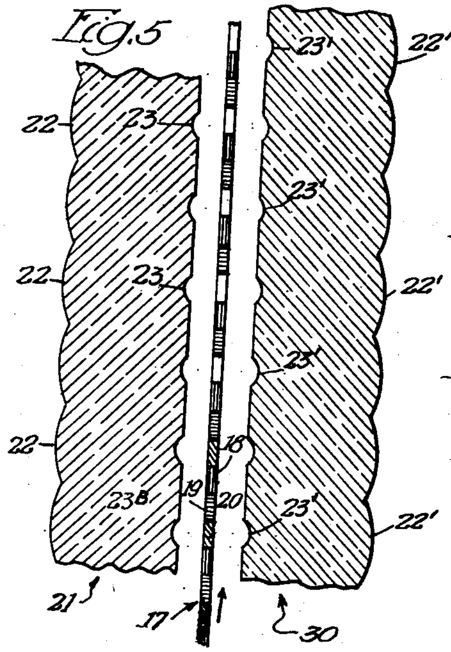
Figure 7:
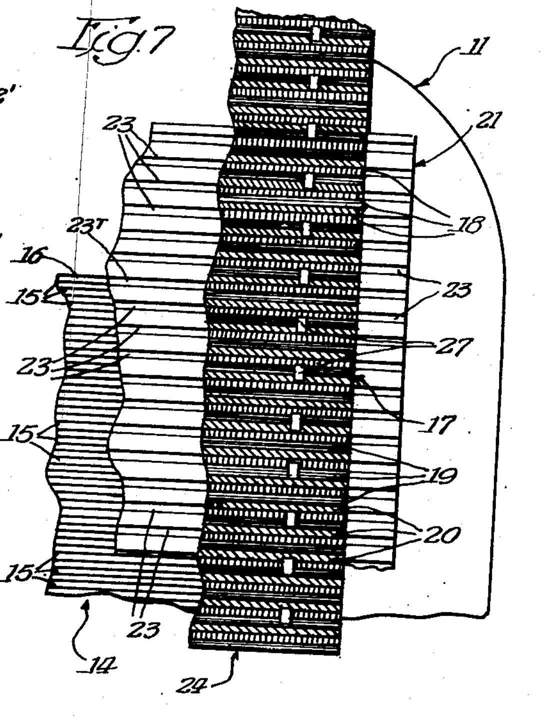
Fig. 7 is an enlarged view of a portion of the structure shown in Fig. 3.

To this end the blocking means preferably comprises a lens having sectional shape substantially as shown in Figs. 4, 5 and 6, the same preferably comprising a formed plate having rounded convex flutes 22 in parallel adjacent relationship and extending transversely of the plate in its screen-facing side, said flutes extending in the direction of scanning movement of the electron beam. The composite lens, in its opposite face, may be formed with concave grooves 23 defining the light transmitting slots or slits of the blocking means. The grooves 23 are parallel and preferably equally spaced in the lens and extend in central parallel registration with its corresponding flute 22. The sectional shape of the lens and its thickness may be carefully controlled so that substantially all light rays applied to the fluted portions of the lens will be concentrated in the light transmitting slits defined by the grooves 23 as indicated in dotted lines in Fig. 4.

The lens may comprise a plate of molded transparent plastic material of the order of $\frac{1}{4}''$ thickness, wherein the flutes 22 have width of the order of $\frac{1}{5}''$, the same being cast on circular arcs having radius of the order of $\frac{1}{5}''$, the grooves 23 having width of the order of $\frac{1}{20}''$, the same being cast on circular arcs having radius of the order of $\frac{1}{16}''$. It is, of course, possible, and within the contemplation of the present invention, to build the blocking means 21 into the tube 11 as an integral part thereof. This may be accomplished by pressing or otherwise forming the glass screen carrying wall of the tube to the sectional shape of the lens member.

The grooves 23 which define the light transmitting slits of the blocking member 21 may be spaced apart slightly more than, or slightly less than, the combined width of the color bands 18, 19 and 20. As shown in Figs. 4, 5 and 6, the spacement of the grooves 23 is less than the combined widths of the color bands 18, 19 and 20 by a distance equal to the width of a color band divided by the number of light transmitting slits included in the blocking member 21 between the opposite sides 16 of the screen, in the direction transversely of the light transmitting slits. Accordingly, a light transmitting slit 23T of the king member 21 may register exactly with olor band, such as a band 18, of the filter mber, at one side of the screen, while the light nsmitting slit 23B of the means 21, at the er side of the screen, will register with a filter or band of unlike color, such as a band 19, the termediate light transmitting slits successively tending in progressively increasing relatively ffset relationship with respect to the intermedi- te color bands 18 of the filter as indicated clearly n Figs. 5 and 6.

By moving the members 17 and 21 relatively n a direction transversely of the color bands and ight transmitting slits, it will be seen that filter bands of like color, such as the bands 18, may be brought successively into vertical registration with the light transmitting slits, from one side of the screen to the other. Such progressive alignment of filter bands of like color with the light transmitting slits, throughout the width of the screen, may be accomplished in response to total relative displacement, of the filter and blocking members, equal to the width of a color band of the filter, that is to say, movement of the order of 1/20''. It will be seen also that such relative displacement will shift a color band, such as a band 18, in registration with the light transmitting slot 23T, at the top of the screen, to a position completely out of registration with such slot, to thus register the next or adjacent color band, such as the band 19, with such slot. Accordingly, by relatively moving the members 17 and 21, each of the bands 18, 19 and 20 may be successively disposed in position to register with the light transmitting slits. While the invention is not necessarily limited to the manner in which the parts are relatively moved, or indeed to relative movement of the screen continuously in one direction with respect to the blocking member, it is expedient and convenient to mount the blocking member 21 in fixed relation with respect to the screen 14 and to provide for continuously moving the filter element in one direction with respect to the blocking means 21. To this end, the filter 17 may be and preferably is formed as a continuous band 24, which may be mounted, as on guiding and driving rollers 25, to move the screen continuously in front of the screen 14. Some or all of the rollers may be formed with sprocket teeth 26 adapted to drivingly engage in suitable spaced perforations 27 formed along and inwardly of the side edges of the strip 22, in position outwardly of the effective viewing area of the screen 14. If desired, as shown at 28, one of the rollers may be constituted as a spring pressed slack takeup roller in order to ensure tautness of the screen, especially in the portions thereof in movement in front of the screen. One of the rollers 25 may be drivingly connected, as with a preferably synchronous driving motor 29 so that the filter may be moved at a carefully controlled and regulated speed, correlated with the movement of the scanning beam of the tube 11, so as to move the filter through a distance equal to the width of a filter color band during one complete scanning cycle of the tube. This may be accomplished by driving the screen at a rate of the order of several linear inches per second, depending on the rate at which the screen is scanned by the scanning beam. To this end the operation of the motor 29 may be monitored by control impulses carried by the signal wave.

Assuming that the tube is scanned along the scanning bands 15 from the top of the screen 14 toward the bottom thereof, and the filter 17 has color bands of width related to the spacement of the light transmitting slits 23, as illustrated in Figs. 4, 5 and 6, and is moved upwardly as indicated by the directional arrows in Figs. 4, 5 and 6, it will be seen that, as the scanning beam progresses downwardly on the screen, during the performance of a scanning cycle, filter bands of like color will be progressively presented opposite the light transmitting slits 23, in exactly timed relationship with the downward progress of the scanning beam. As each portion of the screen is activated by the passage of the scanning beam thereacross, the resultant light rays, emitted by the activated screen, will pass to the eye of an observer through filter color bands of like color character during the performance of a scanning cycle in the tube. At the conclusion of such cycle, as at the lower edge of the screen 14, the filter will be in position presenting, in registration with the uppermost light transmitting slit 23T, a filter band of color different from that which is in filtering position opposite the lowermost light transmitting slit 23B. Accordingly, the light emitted by the screen as the result of activation thereof during any scanning cycle will be transmitted to the eye of the observer through filter bands of color different from those through which light rays were transmitted during the immediately preceding scanning cycle. The eye of the observer thus will receive scanned images in rapid succession and respectively tinted with appropriate color components of the picture being transmitted. This result is accomplished because of the successive presentation of the color bands 18, 19 and 20 of the filter 17, at the light transmitting slots 23, during successive scanning cycles of the tube 11.

While recognizable images may be transmitted through the slots 23 and the filter 17 directly to the eye of the observer, it is desirable to rectify the image carrying light rays by providing a rectifying lens 30, in position covering the filter 17, in registration with the lens forming the blocking means 21, so that light rays transmitted through the slits 23 and the filter may be required to pass through the rectifying lens 30 in travelling to the eye of the observer. Such rectifying lens 30 preferably comprises a composite lens, identical to the transmission lens 21, and having grooves 23' and flutes 22' matching the grooves and flutes of the transmission lens. The rectifying lens may be mounted in horizontal registration with the transmission lens, the grooves 23' of the rectifying lens being disposed vertically opposite the corresponding grooves 23 of the transmission lens, the filter 17, of course, extending between the transmission and rectifying lenses. As shown in dotted lines in Fig. 4, the function of the rectifying lens is to refract light rays, received through the filter, and transmit them in such fashion that the same will correspond exactly with the rays applied to the blocking member 21.

Acceptable color effects may also be attained, without moving the filter continuously in one direction in front of the screen, merely by providing for reciprocating the same in front of the screen, as by forming the filter as a panel slightly larger than the screen and oscillating the same, as by the action of suitable driving means, such as a motor driven cam, in a direction transversely

BEST AVAILABLE COP of the light transmitting slots, in timed relation with the scanning movement of the beam.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A cathode ray tube for television purposes having an integral wall portion supporting fluorescent material on the inner surface of said wall in position to be scanned by an electron beam in the tube, said integral wall portion comprising light transparent material forming a composite lens structure embodying parallel sections extending transversely of said wall portion, each section comprising a convex flute on the inner surface of said wall portion and a concave groove on the outer surface thereof, said groove being in centered registration with respect to the flute to form a light transmitting slit, and said flute forming a converging lens for directing, to said groove, light rays applied at the surface of said flute.

2. In combination, a cathode ray tube for television purposes having an integral wall portion supporting fluorescent material on the inner surface of said wall in position to be scanned by an electron beam in the tube, said integral wall portion comprising light transparent material forming a composite lens structure embodying parallel sections extending transversely of said wall portion, each section comprising a convex flute on the inner surface of said wall portion and a concave groove on the outer surface th of, said groove being in centered registrat with respect to the flute to form a light tra mitting slit, and said flute forming a converg lens for directing, to said groove, light rays a plied at the surface of said flute, a light tran mitting color filter overlying the outer surfa of said integral wall portion and comprising light transparent layer of material formed wi parallel contiguous color band groups each em bodying bands of unlike color disposed in edg abutting relation, the successive bands of each group comprising unlike color components disposed in the same sequence in each band group, whereby bands of like color are equally spaced apart in the filter, and means to relatively shift the filter with respect to said wall portion in a direction transversely of said bands and the light transmitting slits of said lens structure.

References Cited in the file of this patent

UNITED STATES PATENTS

| Number | Name | Date |
|---|---|---|
| 2,086,718 | Knoll | July 13, 1937 |
| 2,091,152 | Malpica | Aug. 24, 1937 |
| 2,268,523 | Clothier et al. | Dec. 30, 1941 |
| 2,296,908 | Crosby | Sept. 29, 1942 |
| 2,312,792 | Bamford | Mar. 2, 1943 |
| 2,330,682 | Clothier et al. | Sept. 28, 1943 |
| 2,339,256 | Doncaster | Jan. 18, 1944 |
| 2,379,730 | Longerich | July 3, 1945 |
| 2,422,937 | Szegho | June 24, 1947 |
| 2,452,293 | De Forest | Oct. 25, 1948 |
| 2,477,645 | Parker | Aug. 2, 1949 |
| 2,479,820 | De Vore | Aug. 23, 1949 |
| 2,538,071 | Young | Jan. 16, 1951 |
| 2,585,846 | Rosenthal | Feb. 12, 1952 |
| 2,605,349 | Homrighous | July 29, 1952 |